(12) United States Patent
Czaplewski-Campbell et al.

(10) Patent No.: US 11,359,975 B2
(45) Date of Patent: Jun. 14, 2022

(54) USING IONIC LIQUIDS IN A PROGRAMMABLE SENSOR

(71) Applicant: International Business Machines Corporation, Armonk, NY (US)

(72) Inventors: Sarah K. Czaplewski-Campbell, Rochester, MN (US); Joseph Kuczynski, North Port, FL (US); Eric J. Campbell, Rochester, MN (US); Timothy J. Tofil, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 712 days.

(21) Appl. No.: 16/271,264

(22) Filed: Feb. 8, 2019

(65) Prior Publication Data
US 2020/0256744 A1    Aug. 13, 2020

(51) Int. Cl.
*G01K 3/00* (2006.01)
*G01K 7/34* (2006.01)
*G01K 1/022* (2021.01)

(52) U.S. Cl.
CPC .............. *G01K 7/343* (2013.01); *G01K 1/022* (2013.01); *G01K 2207/04* (2013.01)

(58) Field of Classification Search
CPC combination set(s) only.
See application file for complete search history.

(56) References Cited

U.S. PATENT DOCUMENTS

| | | | |
|---|---|---|---|
| 6,140,904 A | 10/2000 | Jungst et al. | |
| 7,667,594 B2 | 2/2010 | Funo et al. | |
| 8,299,887 B2 | 10/2012 | Ohtsuka et al. | |
| 8,349,218 B2 | 1/2013 | Gordon | |

(Continued)

FOREIGN PATENT DOCUMENTS

| | | | | |
|---|---|---|---|---|
| CN | 101089908 B | * | 5/2010 | ............. G01K 11/06 |
| DE | 112012003303 T5 | * | 4/2014 | ........... H02N 11/002 |

(Continued)

OTHER PUBLICATIONS

Wikipedia Article on Ionic Liquid, 2017 (Year: 2017).*
(Continued)

*Primary Examiner* — Lisa M Caputo
*Assistant Examiner* — Nasir U. Ahmed
(74) *Attorney, Agent, or Firm* — Matthew J. Bussan

(57) ABSTRACT

Method, apparatus, and computer program product are provided for determining a maximum temperature to which a perishable good or other temperature sensitive item was exposed. In some embodiments, a capacitance of a circuit provided on a substrate is measured. The circuit includes capacitor(s) each having first and second plates separated from each other by an ionic liquid (IL) in a solid state. The IL melts at a predetermined temperature and flows away from the first and second plates into a void. In some embodiments, the predetermined temperature at which the IL melts is different for each capacitor. For example, each capacitor in the circuit may employ a different N-alkyl bezothiazolium salt. A maximum temperature of exposure is determined based on the measured capacitance. In some embodiments, a decision of whether to discard the perishable good or other temperature sensitive item may be based on the determined maximum temperature.

20 Claims, 7 Drawing Sheets

(56) References Cited

U.S. PATENT DOCUMENTS

| | | | |
|---|---|---|---|
| 9,443,688 | B2 | 9/2016 | Whitney et al. |
| 9,626,853 | B2 | 4/2017 | Wood |
| 2015/0171710 | A1 | 6/2015 | Hartmann |
| 2017/0040136 | A1 | 2/2017 | Straub et al. |
| 2017/0169960 | A1* | 6/2017 | Stryzhakova .......... H01G 11/62 |
| 2018/0068803 | A1* | 3/2018 | Brambilla ............. H01G 11/56 |

FOREIGN PATENT DOCUMENTS

| | | | | | |
|---|---|---|---|---|---|
| EP | 1748459 | A1 | | 1/2007 | |
| EP | 2833471 | A1 | * | 2/2015 | ............. C09B 23/04 |
| FR | 2659496 | A1 | * | 9/1991 | ............. H01M 4/70 |
| GB | 730214 | A | * | 5/1955 | ............ B65D 43/022 |

OTHER PUBLICATIONS

Unknown, "Thermal-links/Thermal cutoff/Thermal fuse", 2 pages, downloaded from <http://www.setfuse.com/shaiweite/assets/js/upfiles/files/TCO2013EN/TCO-Axial-V-1A.pdf> on Nov. 2, 2018.

Unknown, "Thermally Sensitive Materials," NineSights, NineSigma, Request No. 3322, 6 pages, printed from <https://ninesights.ninesigma.com/servlet/hype/IMT?userAction=Browse&documentId=96d20a43c636ffe60a0733d90408eaf5&templateName=&document-TableId=3422744958394435395&searchTerm=dGhlcm1hbGx5IHNIbnNpdGl2ZSBtYXRlcmlhbHA&searchContextId=9a457947a7abOdbe33788c46b326116d> on Nov. 3, 2018.

Unknown, "Ionic Liquids for Electrochemical Applications", Sigma-Aldrich Co., 3 pages, printed from <https://www.sigmaaldrich.com/technical-documents/articles/chemfiles/ionic-liquids-electrochemical.printerview.html> on Nov. 2, 2018.

Fujie et al., "Low temperature ionic conductor: ionic liquid incorporated within a metal-organic framework", Chemicals Science, vol. 6, 2015, pp. 4306-4310.

Unknown, "Ionic Liquids—Classes and Properties", InTech, 360 pages, downloaded from <http://www.issp.ac.ru/ebooks/books/open/Ionic_Liquids_-_Classes_and_Properties.pdf> on Nov. 2, 2018.

Unknown, "ChemFiles_Enabling Technologies_Ionic Liquids_vol. 5_No. 6", Sigma-Aldrich, downloaded from <https://www.sigmaaldrich.com/content/dam/sigma-aldrich/docs/Aldrich/Brochure/al_chemfile_v5_n6.pdf> on Nov. 2, 2018.

Nadeem et al., "Solvent-free synthesis of benzothiazolium-based quaternary ammonium salts: precursors to ionic liquids", ARKIVOC: Online Journal of Organic Chemistry, 2010, pp. 19-37.

\* cited by examiner

USING IONIC LIQUIDS IN A PROGRAMMABLE SENSOR

BACKGROUND

The present invention relates in general to the field of sensor technology. More particularly, the present invention relates to using ionic liquids (ILs) in a programmable sensor.

SUMMARY

Embodiments of the present disclosure include a method, apparatus, and computer program product for determining a maximum temperature to which a perishable good (e.g., food, adhesive, sealant, a pharmaceutical or other chemical, or biological material) or other temperature sensitive item (e.g., a temperature sensitive component (TSC) soldered onto a printed circuit board (PCB)) was exposed. In one or more embodiments, a capacitance of a circuit provided on substrate is measured. The substrate may, for example, be affixed to packaging of a perishable good. The circuit includes one or more capacitors each having a first plate and a second plate separated from each other by an ionic liquid (IL) in a solid state. The IL melts at a predetermined temperature and flows away from the first and second plates into a void, such as a reservoir. In one or more embodiments, the predetermined temperature at which the IL melts is different for each capacitor. For example, each capacitor in the circuit may employ a different N-alkyl bezothiazolium salt. A maximum temperature of exposure is determined based on the measured capacitance. In one or more embodiments, a decision of whether to discard the perishable good or other temperature sensitive item may be based on the determined maximum temperature.

BRIEF DESCRIPTION OF THE SEVERAL VIEWS OF THE DRAWINGS

Embodiments will hereinafter be described in conjunction with the appended drawings, where like designations denote like elements.

DETAILED DESCRIPTION

Figure 1A:
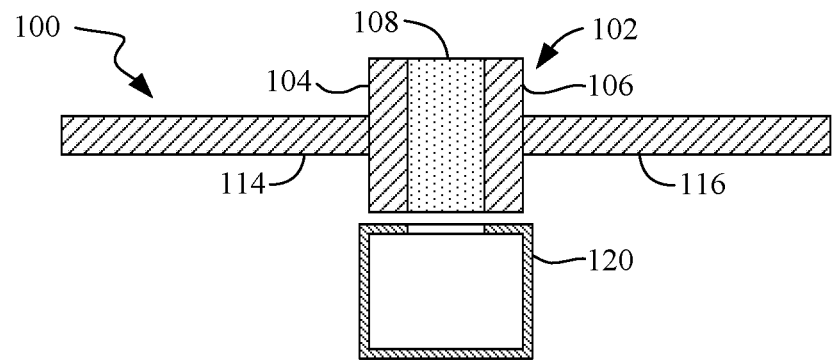
FIG. 1A is a schematic elevational sectional view illustrating a sensor including a capacitor that includes two plates separated from each other by an ionic liquid (IL) in a solid state, according to one or more embodiments.

In accordance with one or more embodiments, a sensor comprises a circuit that includes one or more IL-filled capacitors. Each capacitor has a first plate and a second plate separated from each other by an ionic liquid (IL) in a solid state. The IL melts at a predetermined temperature and flows away from the first and second plates into a void, such as a reservoir. In one or more embodiments, the predetermined temperature at which the IL melts is different for each capacitor. For example, each capacitor in the circuit may employ a different N-alkyl bezothiazolium salt. In one or more embodiments, the circuit is provided on a substrate and a capacitance of the circuit is measured. In some embodiments, the substrate may be affixed to packaging of a perishable good (e.g., food, adhesive, sealant, a pharmaceutical or other chemical, or biological material) or other temperature sensitive item. In some embodiments, the substrate may be a printed circuit board (PCB) onto which a temperature sensitive component (TSC) is soldered. A maximum temperature of exposure is determined based on the measured capacitance. In one or more embodiments, a decision of whether to discard the perishable good or other temperature sensitive item may be based on the determined maximum temperature.

For purposes of this document, including the claims, a "perishable good" is an item that must be stored and/or shipped below a certain temperature to prevent the item from deteriorating (e.g., "perishing") from exposure above the certain temperature. Examples of perishable goods include, but are not limited to, foods, adhesives, sealants, pharmaceuticals, chemicals (especially organic chemicals), and biological materials. Temperature sensitive items include perishable goods, as well as other items that are temperature sensitive, such as a temperature sensitive components (TSCs) soldered onto a PCB.

For purposes of this document, including the claims, an "ionic liquid" (IL) is a salt having an organic cation and an anion. The anion of the IL may be either organic or inorganic. Despite the name, ionic liquids are not necessarily liquids at room temperature. However, ionic liquids may have relatively low melting points compared to inorganic salts. For example, an IL may have a melting point of less than 240 OC. Some ionic liquids have a melting point below 200° C., while other ionic liquids have melting points below 150° C., and still other ionic liquids have melting points below 100° C. An IL below its melting point exists in a solid state and has a relatively low electrical conductivity (i.e., a high electrical impedance). An IL above its melting point exists in a liquid state and has a relatively high electrical conductivity (i.e., a low electrical impedance).

A myriad of known ionic liquids exist. Many of these known ionic liquids may be capable of being used in the IL-filled capacitor, in accordance with one or more embodiments. As defined above, an IL is a salt having an organic cation and an anion. Examples of suitable organic cations and anions are disclosed in detail in U.S. Pat. No. 8,349,218, which is hereby incorporated herein by reference in its entirety. For example, suitable organic cations include, but are not limited to, imidazolium and pyrrolidinium, as well as substituted forms of those organic cations. Suitable anions include, but are not limited to, hexafluorophosphate and tris-(pentafluoroethyl)trifluorophosphate. An example of a preferred ionic liquid is 1-methyl-tridecafluoroocty-imidazolium hexafluorophosphate (Tm~80° C.). Another example of a preferred ionic liquid is 1,1-dimethyl-pyrrolidinium-tris-(pentafluoroethyl)trifluorophosphate (Tm~108° C.). The indicated melting point (Tm) for each of the preferred ionic liquids listed above is as reported in U.S. Pat. No. 8,349,218.

Additional examples of preferred ionic liquids include, but are not limited to, benzothiazolium salts. Exemplary benzothiazolium salts include, but are not limited to, N-alkyl benzothiazolium iodides [I]$^-$, N-alkyl benzothiazolium tetrafluoroborates [BF$_4$]$^-$, N-alkyl benzothiazolium hexafluorophosphates [PF$_6$]$^-$, N-alkyl benzothiazolium bistrifluoromethanesulfonimides [NTf$_2$]$^-$, and N-alkyl benzothiazolium trifluoromethylsulfonates [CF$_3$SO$_3$]$^-$, wherein the alkyl group contains 1-12 carbon atoms. Examples of suitable benzothiazolium salts are disclosed in detail in Nadeem et al., "Solvent-free synthesis of benzothiazolium-based quaternary ammonium salts: precursors to ionic liquids", ARKIVOC: Online Journal of Organic Chemistry, 2010, pp. 19-37, which is hereby incorporated herein by reference in its entirety.

Exemplary N-alkyl benzothiazolium iodides [I]$^-$ include, but not limited to, N-Methylbenzothiazolium iodide (Tm 221-222° C.), N-Ethylbenzothiazolium iodide (Tm 136-137° C.), N-Propylbenzothiazolium iodide (Tm 158-159° C.), N-Iso-propylbenzothiazolium iodide (Tm 131.1° C.), N-Butylbenzothiazolium iodide (Tm 116.3° C.), N-Pentylbenzothiazolium iodide (Tm 117.8° C.), N-Hexylbenzothiazolium iodide (Tm 126.7° C.), N-Heptylbenzothiazolium iodide (Tm 65.1° C.), N-Octylbenzothiazolium iodide (Tm 74.5° C.), N-Nonylbenzothiazolium iodide (Tm 82.1° C.), N-Decylbenzothiazolium iodide (Tm 82.4° C.), N-Undecylbenzothiazolium iodide (Tm 80.4° C.), and N-Dodecylbenzothiazolium iodide (Tm 90.5° C.).

Exemplary N-alkyl benzothiazolium tetrafluoroborates [BF$_4$]$^-$ include, but not limited to, N-Methylbenzothiazolium tetrafluoroborate, N-Ethylbenzothiazolium tetrafluoroborate, N-Propylbenzothiazolium tetrafluoroborate, N-Iso-propylbenzothiazolium tetrafluoroborate, N-Butylbenzothiazolium tetrafluoroborate, N-Pentylbenzothiazolium tetrafluoroborate, N-Hexylbenzothiazolium tetrafluoroborate, N-Heptylbenzothiazolium tetrafluoroborate, N-Octylbenzothiazolium tetrafluoroborate, N-Nonylbenzothiazolium tetrafluoroborate, N-Decylbenzothiazolium tetrafluoroborate, N-Undecylbenzothiazolium tetrafluoroborate, and N-Dodecylbenzothiazolium tetrafluoroborate.

Exemplary N-alkyl benzothiazolium hexafluorophosphates [PF$_6$]$^-$ include, but not limited to, N-Methylbenzothiazolium hexafluorophosphate, N-Ethylbenzothiazolium hexafluorophosphate, N-Propylbenzothiazolium hexafluorophosphate, N-Iso-propylbenzothiazolium hexafluorophosphate, N-Butylbenzothiazolium hexafluorophosphate, N-Pentylbenzothiazolium hexafluorophosphate, N-Hexylbenzothiazolium hexafluorophosphate, N-Heptylbenzothiazolium hexafluorophosphate, N-Octylbenzothiazolium hexafluorophosphate, N-Nonylbenzothiazolium hexafluorophosphate, N-Decylbenzothiazolium hexafluorophosphate, N-Undecylbenzothiazolium hexafluorophosphate, and N-Dodecylbenzothiazolium hexafluorophosphate.

Exemplary N-alkyl benzothiazolium bistrifluoromethanesulfonimides [NTf$_2$]$^-$ include, but not limited to, N-Methylbenzothiazolium bistrifluoromethanesulfonimide (Tm 79.0° C.), N-Ethylbenzothiazolium bistrifluoromethanesulfonimide (Tm 66.2° C.), N-Propylbenzothiazolium bistrifluoromethanesulfonimide (Tm 69.3° C.), N-Iso-propylbenzothiazolium bistrifluoromethanesulfonimide (Tm 88.3° C.), N-Butylbenzothiazolium bistrifluoromethanesulfonimide (Tm 60.6° C.), N-Pentylbenzothiazolium bistrifluoromethanesulfonimide (Tm 49.3° C.), N-Hexylbenzothiazolium bistrifluoromethanesulfonimide (Tm 48.9° C.), N-Heptylbenzothiazolium bistrifluoromethanesulfonimide (Tm 39.6° C.), N-Octylbenzothiazolium bistrifluoromethanesulfonimide (Tm 46.9° C.), N-Nonylbenzothiazolium bistrifluoromethanesulfonimide (Tm 46.3° C.), N-Decylbenzothiazolium bistrifluoromethanesulfonimide (Tm 49.5° C.), N-Undecylbenzothiazolium bistrifluoromethanesulfonimide (Tm 44.2° C.), and N-Dodecylbenzothiazolium bistrifluoromethanesulfonimide (Tm 49.9° C.).

Exemplary N-alkyl benzothiazolium trifluoromethylsulfonates [CF$_3$SO$_3$]$^-$ include, but not limited to, N-Methylbenzothiazolium trifluoromethylsulfonate (Tm 191-192° C.), N-Ethylbenzothiazolium trifluoromethylsulfonate (Tm 126.5° C.), N-Propylbenzothiazolium trifluoromethylsulfonate (Tm 124.1° C.), N-Iso-propylbenzothiazolium trifluoromethylsulfonate (Tm 118.3° C.), N-Butylbenzothiazolium trifluoromethylsulfonate (Tm 106.1° C.), N-Pentylbenzothiazolium trifluoromethylsulfonate (Tm 80.5° C.), N-Hexylbenzothiazolium trifluoromethylsulfonate (Tm 74.0° C.), N-Heptylbenzothiazolium trifluoromethylsulfonate (Tm 58.9° C.), N-Octylbenzothiazolium trifluoromethylsulfonate (Tm 70.2° C.), N-Nonylbenzothiazolium trifluoromethylsulfonate (Tm 64.4° C.), N-Decylbenzothiazolium trifluoromethylsulfonate (Tm 83.1° C.), N-Undecylbenzothiazolium trifluoromethylsulfonate (Tm 75.3° C.), and N-Dodecylbenzothiazolium trifluoromethylsulfonate (Tm 80.2° C.).

The indicated melting point (Tm) for each of the exemplary N-alkyl benzothiazolium iodides [I]$^-$, N-alkyl benzothiazolium bistrifluoromethanesulfonimides [NTf$_2$]$^-$, and N-alkyl benzothiazolium trifluoromethylsulfonates [CF$_3$SO$_3$]$^-$ listed above is as reported in the Nadeem et al. article.

Figure 1B:
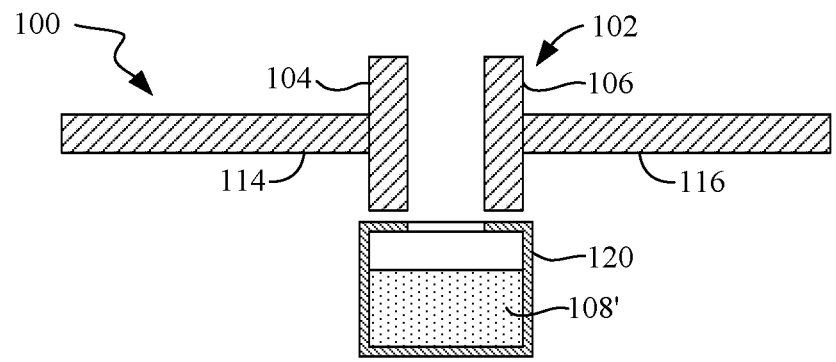
FIG. 1B is a schematic elevational sectional view illustrating the sensor of FIG. 1A after the IL has melted and flowed away from the plates into a reservoir, according to one or more embodiments.
Figure 2:
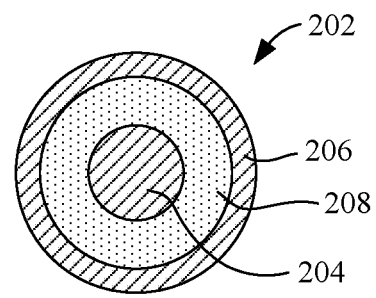
FIG. 2 is a schematic top sectional view illustrating a capacitor that includes two plates, in the form an inner cylinder and an outer cylinder, separated from each other by an ionic liquid (IL) in a solid state, according to one or more embodiments.

Referring to FIG. 1A, a sensor 100 comprises a capacitor 102 that includes two electrically conductive plates 104, 106 separated from each other by an ionic liquid (IL) 108 in a solid state, according to one or more embodiments. FIG. 1B illustrates the sensor 100 of FIG. 1A after the IL 108 has melted and flowed away from the two electrically conductive plates 104, 106 into a reservoir 120 (the "flowed" ionic liquid is denoted as 108' in FIG. 1B), according to one or more embodiments. In the embodiment illustrated in FIGS. 1A and 1B, the plates 104, 106 of the capacitor 102 are parallel plates. The illustrated parallel plate geometry of the capacitor 102 is exemplary, and not limiting. One skilled in the art will appreciate that the plates of the capacitor may be configured to have other geometries, such as the plates in a cylindrical capacitor (an example of which is illustrated in FIG. 2, as well as in FIGS. 3A and 3B).

The plates 104, 106 are electrically connected to electrically conductive wires and/or traces 114, 116, respectively. The plates 104, 106 and the wires and/or traces 114, 116 may be made of copper, silver, aluminum, or any other suitable metal or alloy. The wires and/or traces 114, 116 may electrically connect the capacitor 102 within a circuit that contains to multiple IL-filled capacitors connected in parallel (e.g., circuit 410 containing parallel-connected capacitors 412, 414, 416 in FIG. 4, described below, and circuit 610 containing parallel-connected capacitors 612, 614, 616 in FIG. 6, described below) or connected in series (e.g., circuit 510 containing series-connected capacitors 512, 514, 516 in FIG. 5, described below). The wires and/or traces 114, 116 may also electrically connect the capacitor 102 to an interrogation unit for measuring the capacitance of the capacitor 102 and/or a circuit that contains the capacitor 102.

The IL 108, as shown in FIG. 1A, is in contact with both the electrically conductive plate 104 and the electrically conductive plate 106 and provides a continuous electrical pathway (albeit, the pathway has a high electrical impedance) between the plates 104, 106. The IL 108 may have a melting point at a threshold temperature which is higher than the temperature to which the capacitor 102 is normally exposed. For example, in an embodiment where the capacitor 102 is mounted on packaging that is configured to contain a perishable good or other temperature sensitive item, the IL 108 may be selected that has a melting point at a threshold temperature where the perishable good or other temperature sensitive item is likely to suffer degradation due to excessive temperature. Below the threshold temperature, the IL 108 exists in a solid state and has a relatively low electrical conductivity (i.e., a high electrical impedance). Above the threshold temperature, the IL exists in a liquid state (e.g., the IL melt flows away from the plates 104, 106 and may be captured in a reservoir 120, described below) and typically has a relatively high electrical conductivity (i.e., a low electrical impedance).

By monitoring the capacitance of the capacitor 102 for a major capacitance change (i.e., when air replaces the IL 108 as the dielectric material between the plates 104, 106), exposure of the capacitor 102 to the threshold temperature can be readily determined. Appropriate selection of the IL 108 enables tuning of this major capacitance change over a very wide range of temperatures (e.g., anywhere within the range from approximately 65° C. to approximately 240° C.).

A reservoir 120 may underlie the capacitor 102 and be configured to catch and contain the IL melt falling from the capacitor 102 when the IL 108 melts and flows away from the plates 104, 106 (illustrated in FIG. 1B as the "flowed" ionic liquid 108'). The reservoir 120 is essentially a drip pan to contain the IL melt (which subsequently reverts to a solid state when cooled down below the predetermined temperature). The reservoir 120 may be either a metal (in which case, the reservoir 120 must not contact the plates 104, 106 of the capacitor 102) or non-metal. The reservoir 120 illustrated in FIGS. 1A and 1B is exemplary, and not limiting. One skilled in the art will appreciate that the reservoir may be configured to have other geometries, or may be omitted entirely. The IL melt need only flow into a void (i.e., an open space of some sort).

The IL 108 may be selected to melt at a predetermined temperature (e.g., a threshold temperature at which, if exposed, one or more perishable goods (and/or one or more other temperature sensitive items) contained within packaging on which the capacitor 102 is mounted is/are likely to suffer excessive temperature-related degradation). In this sense, the sensor 100 is "programmable" in that selection of the IL 108 (and, hence, the predetermined temperature at which the IL 108 melts) may be tailored to a particular application.

In accordance with one or more embodiments, when the IL 108 is in a solid state, the capacitance of the capacitor 102 is measured (i.e., the capacitance of the capacitor 102 is a function of the relative permittivity of the dielectric material—the IL 108, at this point—between the plates 104, 106). When the IL 108 melts, the IL melt flows out of the plates 104, 106. As the IL melt flows out of the plates 104, 106, air replaces the IL melt between the plates 104, 106. In accordance with one or more embodiments, subsequent to the IL melt flowing out of the plates 104, 106, the capacitance of the capacitor 102 is measured (i.e., the capacitance of the capacitor 102 is a function of the relative permittivity of the dielectric material—air, at this point—between the plates 104, 106). The change in capacitance indicates the predetermined temperature at which the IL 108 melts (e.g., the threshold temperature) was exceeded.

The capacitor 102 may be assembled by positioning the plates 104, 106 (with or without the wires and/or traces 114, 116) with respect to each other and then immersing the plates 104, 104 positioned with respect to each other in a heated chemical bath containing an IL melt (i.e., ionic liquid in a liquid state). After the IL melt solidifies (i.e., forms the IL 108 in a solid state), the capacitor 102 is withdrawn from the bath. For example, the plates 104, 106 may be positioned with respect to each other by clamping the plates 104, 106 with a spacer (not shown in FIGS. 1A and 1B) imposed therebetween made of non-conductive, porous material. In this case, the IL melt fills the pores of the spacer so as to provide a continuous electrical pathway (albeit, the pathway has a high electrical impedance after the IL melt cools and solidifies to form the IL 108 in a solid state) between the plates 104, 106.

FIG. 2 illustrates a capacitor 202 that includes two plates, in the form an inner cylinder 204 and an outer cylinder 206, separated from each other by an ionic liquid (IL) 208 in a solid state, according to one or more embodiments. The inner cylinder 204, the outer cylinder 206, and the IL 208 of the capacitor 202 illustrated in FIG. 2 functionally correspond, respectively, to the plates 104, 106 and the IL 108 of the capacitor 102 illustrated in FIGS. 1A and 1B, but are configured as a cylindrical capacitor in lieu of a planar capacitor.

Figure 3A:
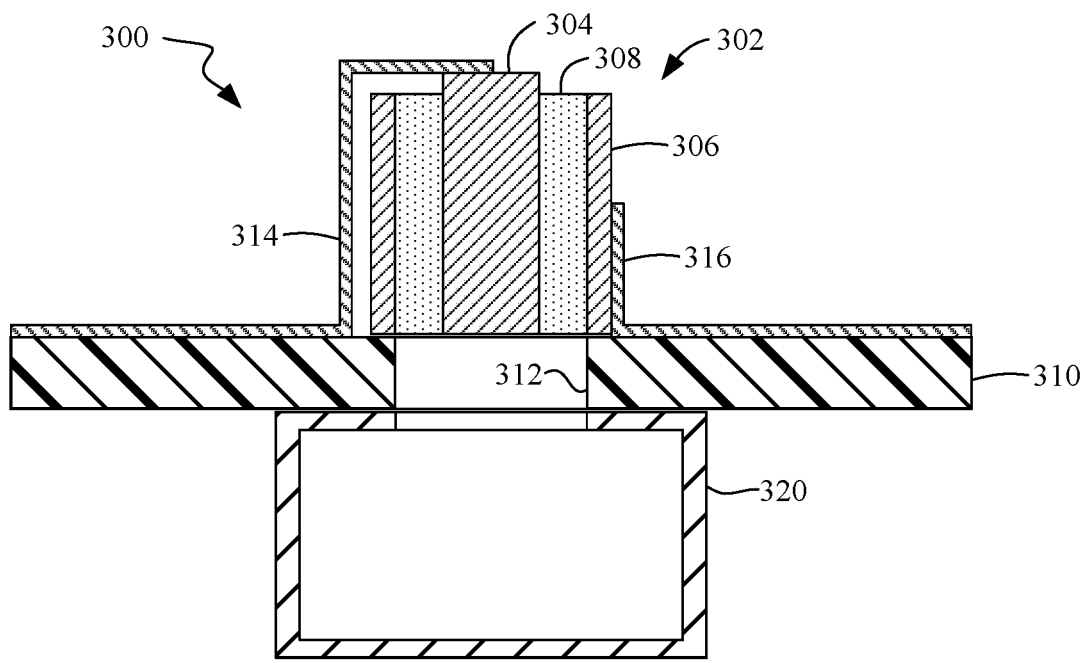
FIG. 3A is a schematic elevational sectional view illustrating a sensor including a capacitor that includes two plates, in the form of an inner cylinder and an outer cylinder, separated from each other by an ionic liquid (IL) in a solid state, wherein the sensor is provided on a substrate, according to one or more embodiments.
Figure 3B:
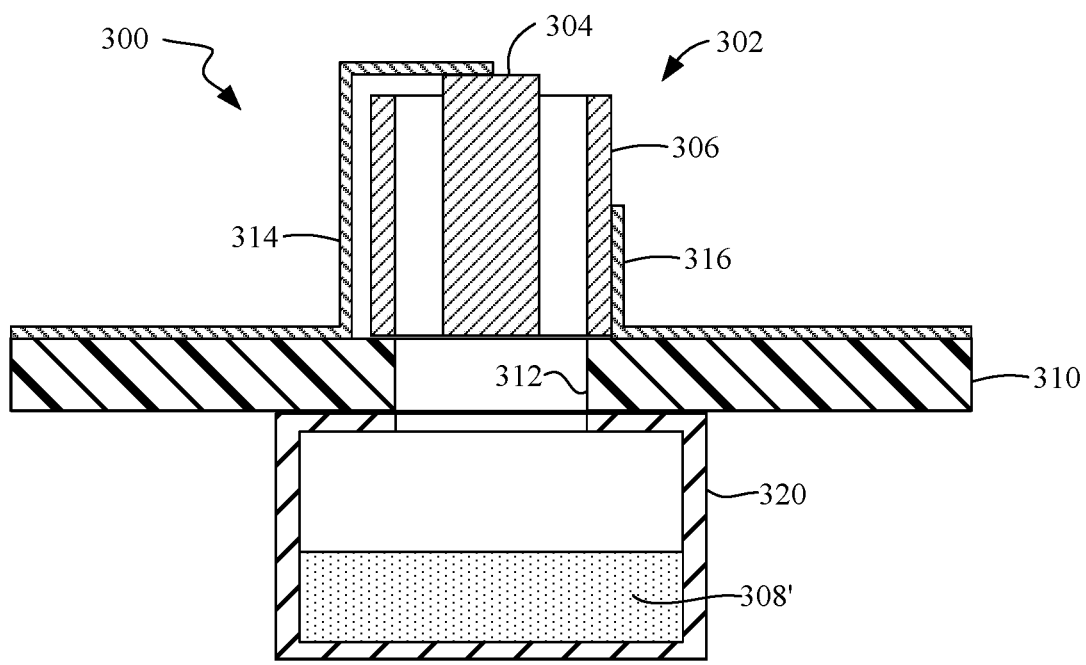
FIG. 3B is a schematic elevational sectional view illustrating the sensor of FIG. 3A after the IL has melted and flowed away from the plates, through a hole in the substrate, and into a reservoir, according to one or more embodiments.

Referring now to FIG. 3A, a sensor 300 comprises a capacitor 302 that includes two plates, in the form of an inner cylinder 304 and an outer cylinder 306, separated from each other by an ionic liquid (IL) 308 in a solid state, wherein the sensor 300 is provided on a substrate 310, according to one or more embodiments. FIG. 3B illustrates the sensor 300 of FIG. 3A after the IL 308 has melted and flowed away from the inner and outer cylinders 304, 306, through a hole 312 in the substrate 310, and into a reservoir 320 (the "flowed" ionic liquid is denoted as 308' in FIG. 3B), according to one or more embodiments. The illustrated cylindrical plate geometry of the capacitor 302 is exemplary, and not limiting. One skilled in the art will appreciate that the plates of the capacitor may be configured to have other geometries.

The inner and outer cylinders 304, 306 are electrically connected to electrically conductive wires and/or traces 314, 316, respectively. The inner and outer cylinders 304, 306 and the wires and/or traces 314, 316 may be made of copper, silver, aluminum, or any other suitable metal or alloy. The substrate 310 may be made of any suitable insulating material. In some embodiments, the substrate 310 may be a packaging material, such as cardboard or plastic. In other embodiments, the substrate 310 may be a printed circuit board (PCB) material, such as a FR4 substrate. The wires and/or traces 314, 316 may electrically connect the capacitor 302 within a circuit containing multiple IL-filled capacitors connected in parallel (e.g., circuit 410 containing parallel-connected capacitors 412, 414, and 416 in FIG. 4, described below, circuit 610 containing parallel-connected capacitors 612, 614, and 616 in FIG. 6, described below) or connected in series (e.g., circuit 510 containing series-connected capacitors 512, 514, and 516 in FIG. 5, described below). The wires and/or traces 314, 316 may also electrically connect the capacitor 302 to an interrogation unit for measuring the capacitance of the capacitor 302 and/or a circuit that contains the capacitor 302.

The IL 308, as shown in FIG. 3A, is in contact with both the electrically conductive inner cylinder 304 and the electrically conductive outer cylinder 306 and provides a continuous electrical pathway (albeit, the pathway has a high electrical impedance) between the inner and outer cylinders 304, 306. The IL 308 may have a melting point at a threshold temperature which is higher than the temperature to which the capacitor 302 is normally exposed. For example, in an embodiment where the sensor 300 is mounted on (or otherwise integrated into) packaging configured to contain a perishable good or other temperature sensitive item, the IL 308 may be selected that has a melting point at a threshold temperature where the perishable good or other temperature sensitive item is likely to suffer degradation due to excessive temperature. Below the threshold temperature, the IL 308 exists in a solid state and has a relatively low electrical conductivity (i.e., a high electrical impedance). Above the threshold temperature, the IL exists in a liquid state (e.g., the IL melt flows away from the inner and outer cylinders 304, 306, through a hole 312 in the substrate 310, and may be captured in a reservoir 320, described below) and typically has a relatively high electrical conductivity (i.e., a low electrical impedance).

By monitoring the capacitance of the capacitor 302 for a major capacitance change (i.e., when air replaces the IL 308 as the dielectric material between the inner and outer cylinders 304, 306), exposure of the capacitor 302 to the threshold temperature can be readily determined. Appropriate selection of the IL 308 enables tuning of this major capacitance change over a very wide range of temperatures (e.g., anywhere within the range from approximately 65° C. to approximately 240° C.).

A porous spacer (not shown in FIGS. 3A and 3B) made of non-conductive, porous material may be provided between the inner and outer cylinders 304, 306 to ensure the inner cylinder 304 does not contact the outer cylinder 306. If such a spacer is utilized, the pores of the spacer are filled with the IL so as to provide a continuous electrical pathway (albeit, the pathway has a high electrical impedance) between the inner cylinder and the outer cylinder.

A reservoir 320 may underlie the capacitor 302 and be configured to catch and contain the IL melt falling from the capacitor 302 when the IL 308 melts and flows away from the inner and outer cylinders 304, 306 and through the hole 312 in the substrate 310 (illustrated in FIG. 3B as the "flowed" ionic liquid 308'). The reservoir 320 is essentially a drip pan to contain the IL melt (which subsequently reverts to a solid state when cooled down below the predetermined temperature). The reservoir 320 may be either a metal or non-metal. The reservoir 320 illustrated in FIGS. 3A and 3B is exemplary, and not limiting. One skilled in the art will appreciate that the reservoir may be configured to have other geometries, or may be omitted entirely. The IL melt need only flow into a void (i.e., an open space of some sort).

The IL 308 may be selected to melt at a predetermined temperature (e.g., a threshold temperature at which, if exposed, one or more perishable goods (and/or one or more other temperature sensitive items) contained within packaging on which the sensor 300 is mounted is/are likely to suffer excessive temperature-related degradation). In this sense, the sensor 300 is "programmable" in that selection of the IL 308 (and, hence, the predetermined temperature at which the IL 308 melts) may be tailored to a particular application.

In accordance with one or more embodiments, when the IL 308 is in a solid state, the capacitance of the capacitor 302 is measured (i.e., the capacitance of the capacitor 302 is a function of the relative permittivity of the dielectric material—the IL 308, at this point—between the inner and outer cylinders 304, 306). When the IL 308 melts, the IL melt flows out of the inner and outer cylinders 304, 306. As the IL melt flows out of the inner and outer cylinders 304, 306, air replaces the IL melt between the inner and outer cylinders 304, 306. In accordance with one or more embodiments, subsequent to the IL melt flowing out of the inner and outer cylinders 304, 306, the capacitance of the capacitor 302 is measured (i.e., the capacitance of the capacitor 302 is a function of the relative permittivity of the dielectric material—air, at this point—between the inner and outer cylinders 304, 306). The change in capacitance indicates the predetermined temperature at which the IL 308 melts (e.g., the threshold temperature) was exceeded.

The capacitor 302 may be assembled by positioning the inner cylinder 304 within the outer cylinder 306 (with or without the porous spacer) and then immersing one end of the inner and outer cylinders 304, 306 in a heated chemical bath containing an IL melt (i.e., ionic liquid in a liquid state). A vacuum is then applied to the other end of the outer cylinder 306 so as to draw the IL melt into the outer cylinder 306. After the IL melt solidifies (i.e., forms the IL 308 in a solid state), the capacitor 302 is withdrawn from the bath.

In accordance with one or more embodiments, two or more IL-filled capacitors, each with an IL of different Tm, are incorporated in a circuit either in parallel (e.g., circuit 410 in FIG. 4, described below, and circuit 610 in FIG. 6, described below) or in series (e.g., circuit 510 in FIG. 5, described below). The capacitance of the circuit may be monitored in real-time or subsequently measured (e.g., after storage and/or shipment of a perishable good or other temperature sensitive item within packaging on which the circuit is mounted). For example, as the capacitance of the circuit is monitored and the temperature increases, the lowest Tm ionic liquid melts and the resulting change in capacitance of the circuit is measured. As the temperature increases further, the next lowest Tm ionic liquid melts and the resulting change in the capacitance of the circuit is measured. This sequence of events is repeated as the temperature climbs. In such a configuration, a single circuit incorporating multiple IL-filled capacitors may be used to determine the maximum temperature to which a perishable good or other temperature sensitive item was subjected.

Figure 4:
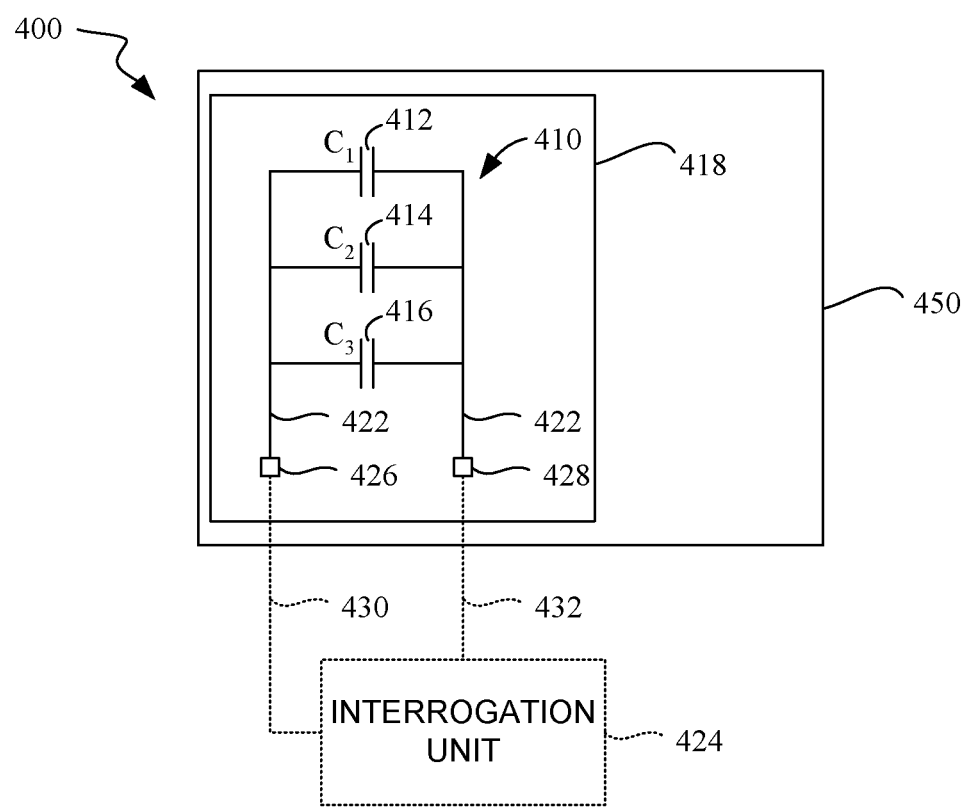
FIG. 4 is a block diagram illustrating a sensor including a circuit in which three IL-filled capacitors are connected in parallel, wherein the sensor is provided on a substrate affixed to packaging containing a perishable good or other temperature sensitive item, according to one or more embodiments.

Referring now to FIG. 4, a sensor 400 is illustrated that includes a circuit 410 in which three IL-filled capacitors 412, 414, 416 are connected in parallel, wherein the sensor 400 is provided on a substrate 418 affixed to packaging 450 containing a perishable good or other temperature sensitive item (not shown), according to one or more embodiments. In the embodiment illustrated in FIG. 4, the circuit 410 incorporates three IL-filled capacitors. The number of IL-filled capacitors incorporated in the circuit 410 is exemplary, and not limiting. One skilled in the art will appreciate that any number of IL-filled capacitors may be incorporated in the circuit.

Each of the three IL-filled capacitors 412, 414, 416 illustrated in FIG. 4 may correspond to the IL-filled capacitor 102 (i.e., parallel plate capacitor) illustrated in FIG. 1A or the IL-filled capacitor 302 (i.e., cylindrical capacitor) illustrated in FIG. 3A. In the embodiment illustrated in FIG. 4, the three IL-filled capacitors 412, 414, 416 are provided on a substrate 418, which may be affixed to packaging 450 configured to contain a perishable good or other temperature sensitive item. The substrate 418 may be affixed to the packaging 450 by any suitable conventional technique, such as adhesive. Only a portion of packaging 450 is shown in FIG. 4. The packaging 450 may, for example, be configured to contain one or more perishable goods, such as foods, adhesives, sealants, pharmaceuticals or other chemicals, and/or biological materials.

In the embodiment illustrated in FIG. 4, a plurality of electrically conductive wires and/or traces 422 in the circuit 410 are configured to electrically connect the three IL-filled capacitors 412, 414, 416 to each other. In addition, the circuit 410 may include a pair of sensor contacts 426, 428 configured to be operatively connected via probes 430, 432 to an interrogation unit 424 for measuring the capacitance of the circuit 410. In other embodiments, the circuit 410 may include a wireless transceiver configured to be operatively connected to an interrogation unit via a wireless connection.

The IL-filled capacitors 412, 414, and 416 respectively have capacitances $C_1$, $C_2$, and $C_3$. The total capacitance $C_T$ of the "parallel-connected" capacitor circuit 410 is given by the following formula:

$$C_T = C_1 + C_2 + C_3$$

Each of the IL-filled capacitors 412, 414, and 416 contains an IL of different Tm. In this example, the IL-filled capacitor 412 has the lowest Tm (i.e., $Tm_1$) ionic liquid, the IL-filled capacitor 414 has the next lowest Tm (i.e., $Tm_2$) ionic liquid, and the IL-filled capacitor 416 has the highest Tm (i.e., $Tm_3$) ionic liquid. Accordingly, $Tm_1 < Tm_2 < Tm_3$. For example, the ILs of the respective IL-filled capacitors 412, 414, 416 may be selected to melt in a succession of different threshold temperatures at which, if exposed, the perishable good or other temperature sensitive item contained in the packaging 450 is increasingly likely to suffer excessive temperature-related degradation.

The capacitance of the circuit 410 may be monitored in real-time or subsequently measured (e.g., after storage and/or shipment of a perishable good or other temperature sensitive item within packaging 450 on which the sensor 400 is mounted). For example, as the capacitance of the circuit is monitored (e.g., by the interrogation unit 424) and the temperature increases, the lowest Tm (i.e., $Tm_1$) ionic liquid melts and the resulting change in capacitance of the circuit is measured. At that point, the capacitance of the capacitor 412 would change from $C_1$ to $C_{1\_final}$ as air replaces the IL as the dielectric material between the plates in the capacitor 412, reducing the total capacitance of the circuit 410 to $C_T = (C_{1\_final}) + C_2 + C_3$. As the temperature increases further, the next lowest Tm (i.e., $Tm_2$) ionic liquid melts and the resulting change in the capacitance of the circuit is measured. At that point, the capacitance of the capacitor 414 would change from $C_2$ to $C_{2\_final}$ as air replaces the IL as the dielectric material between the plates in the capacitor 414, reducing the total capacitance of the circuit 410 to $C_T = (C_{1\_final}) + (C_{2\_final}) + C_3$. As the temperature increases still further, the highest Tm (i.e., $Tm_3$) ionic liquid melts and the resulting change in the capacitance of the circuit is measured. At that point, the capacitance of the capacitor 416 would change from $C_3$ to $C_{3\_final}$ as air replaces the IL as the dielectric material between the plates in the capacitor 416, reducing the total capacitance of the circuit 410 to $C_T = (C_{1\_final}) + (C_{2\_final}) + (C_{3\_final})$. Hence, by measuring the capacitance of the circuit 410, the interrogation unit 424 may determine the maximum temperature to which the perishable good or other temperature sensitive item was subjected. In accordance with one or more embodiments, based on the determination of the maximum temperature to which the perishable good or other temperature sensitive item was subjected, a determination may be made as to whether to discard the perishable good or other temperature sensitive item.

In accordance with one or more embodiments, the interrogation unit 424 measures the capacitance of the circuit 410. Based on the measured capacitance, in accordance with one or more embodiments, the interrogation unit 424 may determine a maximum temperature to which the perishable good or other temperature sensitive item was exposed by comparing the measured capacitance to capacitance data (e.g., a look-up table that relates previously measured capacitances for circuits identical to the circuit 410 with respect to the predetermined temperatures $Tm_1$, $Tm_2$, and $Tm_3$). Moreover, in accordance with one or more embodiments, based on the determination of the maximum temperature to which the perishable good or other temperature sensitive item was exposed, the interrogation unit 424 may determine whether to discard the perishable good or other temperature sensitive item. For example, the interrogation unit 424 may be configured to retain the perishable good or other temperature sensitive item if just $Tm_1$ was reached (neither $Tm_2$ nor $Tm_3$ were reached), to cause the perishable good or other temperature sensitive item to be inspected for possible retention if just $Tm_1$ and $Tm_2$ were reached ($Tm_3$ was not reached), and to discard the perishable good or other temperature sensitive item if $Tm_3$ was reached.

Figure 5:
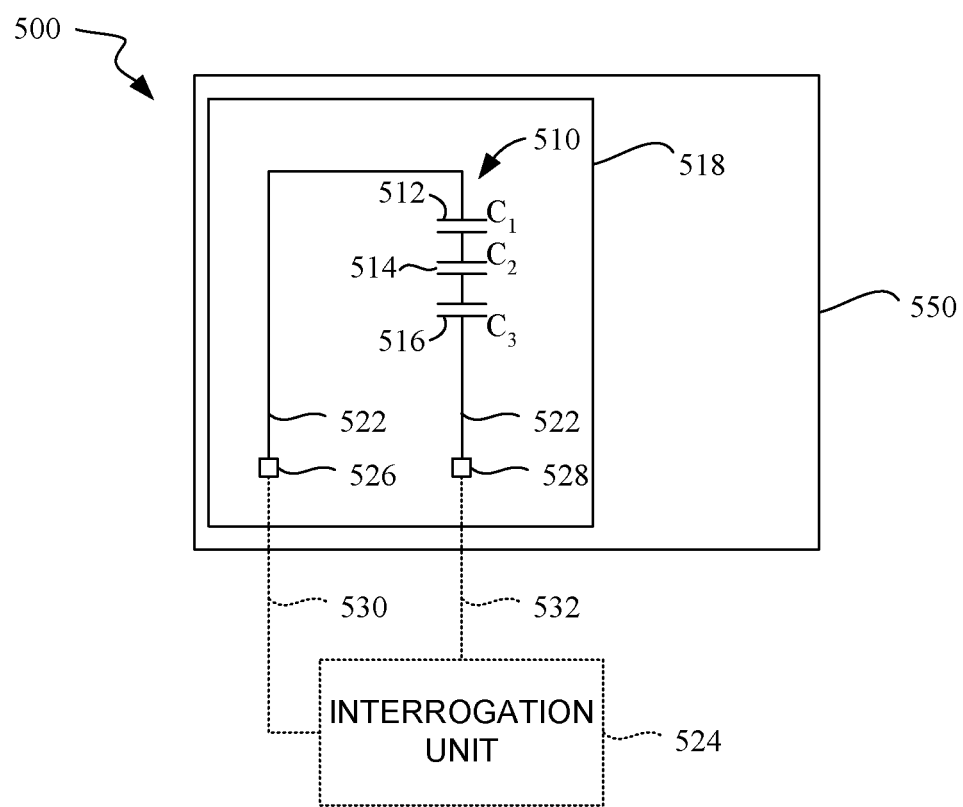
FIG. 5 is a block diagram illustrating a sensor including a circuit in which three IL-filled capacitors are connected in series, wherein the sensor is provided on a substrate affixed to packaging containing a perishable good or other temperature sensitive item, according to one or more embodiments.

Referring now to FIG. 5, a sensor 500 is illustrated that includes a circuit 510 in which three IL-filled capacitors 512, 514, 516 are connected in series, wherein the sensor 500 is provided on a substrate 518 affixed to packaging 550 containing a perishable good or other temperature sensitive item (not shown), according to one or more embodiments. In the embodiment illustrated in FIG. 5, the circuit 510 incorporates three IL-filled capacitors. The number of IL-filled capacitors incorporated in the circuit 510 is exemplary, and not limiting. One skilled in the art will appreciate that any number of IL-filled capacitors may be incorporated in the circuit.

Each of the three IL-filled capacitors 512, 514, 516 illustrated in FIG. 5 may correspond to the IL-filled capacitor 102 (i.e., parallel plate capacitor) illustrated in FIG. 1A or the IL-filled capacitor 302 (i.e., cylindrical capacitor) illustrated in FIG. 3A. In the embodiment illustrated in FIG. 5, the three IL-filled capacitors 512, 514, 516 are provided on a substrate 518, which may be affixed to packaging 550 configured to contain a perishable good or other temperature sensitive item. The substrate 518 may be affixed to the packaging 550 by any suitable conventional technique, such as adhesive. Only a portion of packaging 550 is shown in FIG. 5. The packaging 550 may, for example, be configured to contain one or more perishable goods, such as foods, adhesives, sealants, pharmaceuticals or other chemicals, and/or biological materials.

In the embodiment illustrated in FIG. 5, a plurality of electrically conductive wires and/or traces 522 in the circuit 510 are configured to electrically connect the three IL-filled capacitors 512, 514, 516 to each other. In addition, the circuit 510 may include a pair of sensor contacts 526, 528 configured to be operatively connected via probes 530, 532 to an interrogation unit 524 for measuring the capacitance of the circuit 510. In other embodiments, the circuit 510 may include a wireless transceiver configured to be operatively connected to an interrogation unit via a wireless connection.

The IL-filled capacitors 512, 514, and 516 respectively have capacitances $C_1$, $C_2$, and $C_3$. The total capacitance $C_T$ of the "series-connected" capacitor circuit 510 is given by the following formula:

$$C_T = 1/(1/C_1 + 1/C_2 + 1/C_3)$$

Each of the IL-filled capacitors 512, 514, and 516 contains an IL of different Tm. In this example, the IL-filled capacitor 512 has the lowest Tm (i.e., $Tm_1$) ionic liquid, the IL-filled capacitor 514 has the next lowest Tm (i.e., $Tm_2$) ionic liquid, and the IL-filled capacitor 516 has the highest Tm (i.e., $Tm_3$) ionic liquid. Accordingly, $Tm_1 < Tm_2 < Tm_3$. For example, the ILs of the respective IL-filled capacitors 512, 514, and 514 may be selected to melt in a succession of different threshold temperatures at which, if exposed, the perishable good or other temperature sensitive item contained in the packaging 550 is increasingly likely to suffer excessive temperature-related degradation.

The capacitance of the circuit 510 may be monitored in real-time or subsequently measured (e.g., after storage and/or shipment of a perishable good or other temperature sensitive item within packaging 550 on which the sensor 500 is mounted). For example, as the capacitance of the circuit is monitored (e.g., by the interrogation unit 524) and the temperature increases, the lowest Tm (i.e., $Tm_1$) ionic liquid melts and the resulting change in capacitance of the circuit is measured. At that point, the capacitance of the capacitor 512 would change from $C_1$ to $C_{1\_final}$ as air replaces the IL as the dielectric material between the plates in the capacitor 512, reducing the total capacitance of the circuit 510 to $C_T = 1/(1/(C_{1\_final}) + 1/C_2 + 1/C_3)$. As the temperature increases further, the next lowest Tm (i.e., $Tm_2$) ionic liquid melts and the resulting change in the capacitance of the circuit is measured. At that point, the capacitance of the capacitor 514 would change from $C_2$ to $C_{2\_final}$ as air replaces the IL as the dielectric material between the plates in the capacitor 514, reducing the total capacitance of the circuit 510 to $C_T = 1/(1/(C_{1\_final}) + 1/(C_{2\_final}) + 1/C_3)$. As the temperature increases still further, the highest Tm (i.e., $Tm_3$) ionic liquid melts and the resulting change in the capacitance of the circuit is measured. At that point, the capacitance of the capacitor 516 would change from $C_3$ to $C_{3\_final}$ as air replaces the IL as the dielectric material between the plates in the capacitor 516, reducing the total capacitance of the circuit 510 to $C_T = 1/(1/(C_{1\_final}) + 1/(C_{2\_final}) + 1/(C_{3\_final}))$. Hence, by measuring the capacitance of the circuit 510, the interrogation unit 524 may determine the maximum temperature to which the perishable good or other temperature sensitive item was subjected. In accordance with one or more embodiments, based on the determination of the maximum temperature to which the perishable good or other temperature sensitive item was subjected, a determination may be made as to whether to discard the perishable good or other temperature sensitive item.

In accordance with one or more embodiments, the interrogation unit 524 measures the capacitance of the circuit 510. Based on the measured capacitance, in accordance with one or more embodiments, the interrogation unit 524 may determine a maximum temperature to which the perishable good or other temperature sensitive item was exposed by comparing the measured capacitance to capacitance data (e.g., a look-up table that relates previously measured capacitances for circuits identical to the circuit 510 with respect to the predetermined temperatures $Tm_1$, $Tm_2$, and $Tm_3$). Moreover, in accordance with one or more embodiments, based on the determination of the maximum temperature to which the perishable good or other temperature sensitive item was exposed, the interrogation unit 524 may determine whether to discard the perishable good or other temperature sensitive item. For example, the interrogation unit 524 may be configured to retain the perishable good or other temperature sensitive item if just $Tm_1$ was reached (neither $Tm_2$ nor $Tm_3$ were reached), to cause the perishable good or other temperature sensitive item to be inspected for possible retention if just $Tm_1$ and $Tm_2$ were reached ($Tm_3$ was not reached), and to discard the perishable good or other temperature sensitive item if $Tm_3$ was reached.

Figure 6:
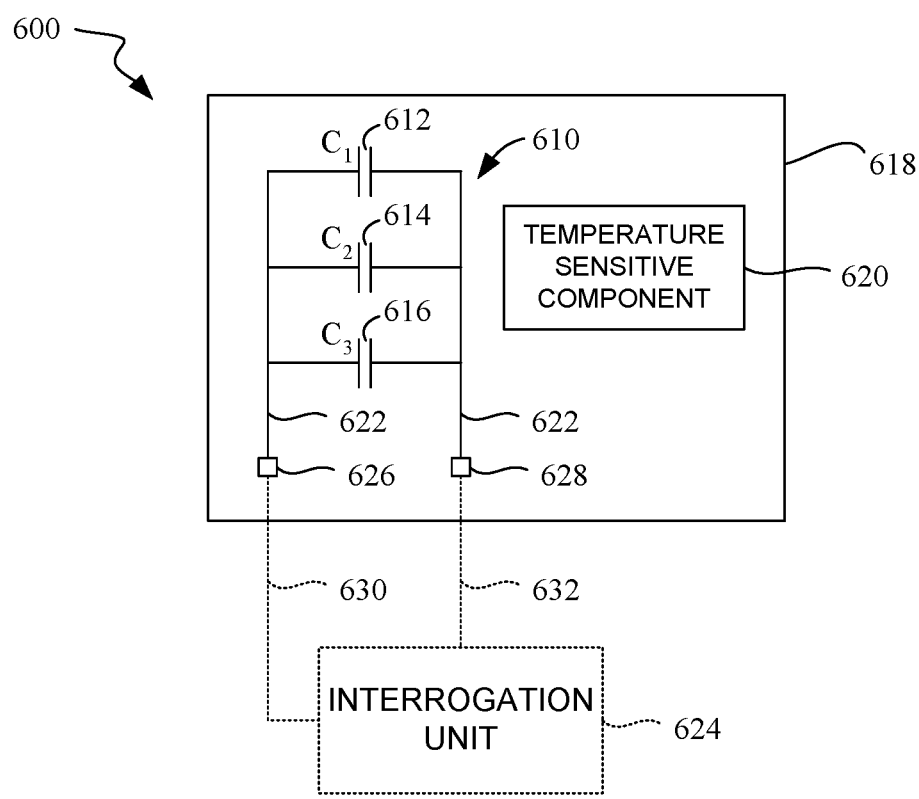
FIG. 6 is a block diagram illustrating a sensor including a circuit in which three IL-filled capacitors are connected in parallel, wherein the sensor is provided on a printed circuit board (PCB) in proximity to a temperature sensitive component (TSC), according to one or more embodiments.

Referring now to FIG. 6, a sensor 600 is illustrated that includes a circuit 610 in which three IL-filled capacitors 612, 614, 616 are connected in parallel, wherein the sensor 600 is provided on a printed circuit board (PCB) 618 in proximity to a temperature sensitive component (TSC) 620, according to one or more embodiments. In the embodiment illustrated in FIG. 6, the circuit 610 incorporates three IL-filled capacitors, which are connected in parallel. The number and connection-type of IL-filled capacitors incorporated in the circuit 610 is exemplary, and not limiting. One skilled in the art will appreciate that any number of IL-filled capacitors may be incorporated in the circuit, connected either in parallel or in series.

Each of the three IL-filled capacitors 612, 614, 616 illustrated in FIG. 6 may correspond to the IL-filled capacitor 102 (i.e., parallel plate capacitor) illustrated in FIG. 1A or the IL-filled capacitor 302 (i.e., cylindrical capacitor) illustrated in FIG. 3A. In the embodiment illustrated in FIG. 6, the three IL-filled capacitors 612, 614, 616 are provided on a printed circuit board (PCB) 618 in close proximity to a temperature sensitive component (TSC) 620, which may also mounted on the PCB 618. The TSC 620 may, for example, be an electronic component soldered onto a PCB that must not be exposed to excessive temperatures (e.g., temperatures above 217° C.) for more than certain durations (e.g., greater than 90-120 seconds). Extra care may be needed during soldering, for example, when a PCB includes a TSC. The TSC is likely to suffer degradation if exposed to excessive temperatures.

In the embodiment illustrated in FIG. 6, a plurality of electrically conductive wires and/or traces 622 in the circuit 610 are configured to electrically connect the three IL-filled capacitors 612, 614, 616 to each other. In addition, the circuit 610 may include a pair of sensor contacts 626, 628 configured to be operatively connected via probes 630, 632 to an interrogation unit 624 for measuring the capacitance of the circuit 610. In other embodiments, the circuit 610 may include a wireless transceiver configured to be operatively connected to an interrogation unit via a wireless connection.

The IL-filled capacitors 612, 614, and 616 respectively have capacitances $C_1$, $C_2$, and $C_3$. The total capacitance $C_T$ of the "parallel-connected" capacitor circuit 610 is given by the following formula:

$$C_T = C_1 + C_2 + C_3$$

Each of the IL-filled capacitors 612, 614, and 616 contains an IL of different Tm. In this example, the IL-filled capacitor 612 has the lowest Tm (i.e., $Tm_1$) ionic liquid, the IL-filled capacitor 614 has the next lowest Tm (i.e., $Tm_2$) ionic liquid, and the IL-filled capacitor 616 has the highest Tm (i.e., $Tm_3$) ionic liquid. Accordingly, $Tm_1 < Tm_2 < Tm_3$. For example, the ILs of the respective IL-filled capacitors 612, 614, 616 may be selected to melt in a succession of different threshold temperatures at which, if exposed, the TSC 620 is increasingly likely to suffer excessive temperature-related degradation.

The capacitance of the circuit 610 may be monitored in real-time or subsequently measured (e.g., after one or more soldering operations is/are performed on the PCB 618 in proximity to the TSC 620). For example, as the capacitance of the circuit is monitored (e.g., by the interrogation unit 624) and the temperature increases, the lowest Tm (i.e., $Tm_1$) ionic liquid melts and the resulting change in capacitance of the circuit is measured. At that point, the capacitance of the capacitor 612 would change from $C_1$ to $C_{1\_final}$ as air replaces the IL as the dielectric material between the plates in the capacitor 612, reducing the total capacitance of the circuit 610 to $C_T = (C_{1\_final}) + C_2 + C_3$. As the temperature increases further, the next lowest Tm (i.e., $Tm_2$) ionic liquid melts and the resulting change in the capacitance of the circuit is measured. At that point, the capacitance of the capacitor 614 would change from $C_2$ to $C_{2\_final}$ as air replaces the IL as the dielectric material between the plates in the capacitor 614, reducing the total capacitance of the circuit 610 to $C_T = (C_{1\_final}) + (C_{2\_final}) + C_3$. As the temperature increases still further, the highest Tm (i.e., $Tm_3$) ionic liquid melts and the resulting change in the capacitance of the circuit is measured. At that point, the capacitance of the capacitor 616 would change from $C_3$ to $C_{3\_final}$ as air replaces the IL as the dielectric material between the plates in the capacitor 616, reducing the total capacitance of the circuit 610 to $C_T = (C_{1\_final}) + (C_{2\_final}) + (C_{3\_final})$. Hence, by measuring the capacitance of the circuit 610, the interrogation unit 624 may determine the maximum temperature to which the TSC 620 was subjected. In accordance with one or more embodiments, based on the determination of the maximum temperature to which the TSC 620 was subjected, a determination may be made as to whether to discard the TSC 620.

In accordance with one or more embodiments, the interrogation unit 624 measures the capacitance of the circuit 610. Based on the measured capacitance, in accordance with one or more embodiments, the interrogation unit 624 may determine a maximum temperature to which the TSC 620 was exposed by comparing the measured capacitance to capacitance data (e.g., a look-up table that relates previously measured capacitances for circuits identical to the circuit 610 with respect to the predetermined temperatures $Tm_1$, $Tm_2$, and $Tm_3$). Moreover, in accordance with one or more embodiments, based on the determination of the maximum temperature to which the TSC 620 was exposed, the interrogation unit 624 may determine whether to discard the TSC 620. For example, the interrogation unit 624 may be configured to retain the TSC 620 if just $Tm_1$ was reached (neither $Tm_2$ nor $Tm_3$ were reached), to cause the TSC 620 to be inspected for possible retention if just $Tm_1$ and $Tm_2$ were reached ($Tm_3$ was not reached), and to discard the TSC 620 if $Tm_3$ was reached.

Figure 7:
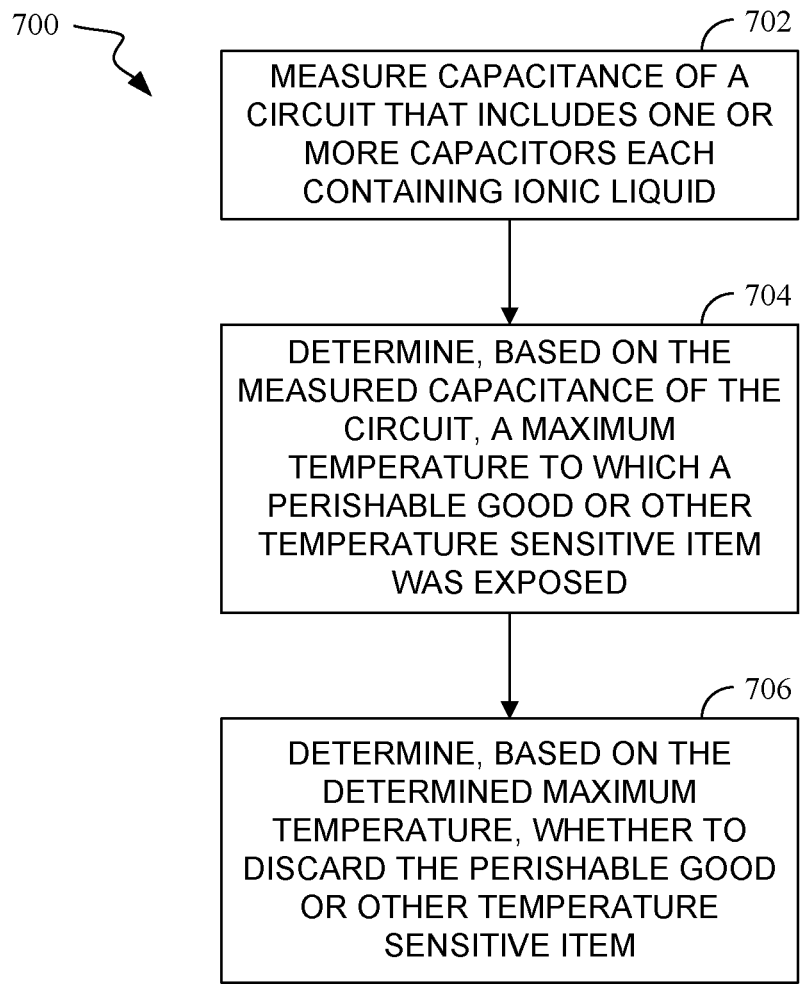
FIG. 7 is a flow diagram of an illustrative method of determining a maximum temperature to which a perishable good or other temperature sensitive item was exposed and, based on the determined maximum temperature, determining whether to discard the perishable good or other temperature sensitive item, according to one or more embodiments.

FIG. 7 is a flow diagram of an illustrative method 700 of determining a maximum temperature to which a perishable good or other temperature sensitive item was exposed and, based on the determined maximum temperature, determining whether to discard the perishable good or other temperature sensitive item, according to one or more embodiments. The method 700 sets forth the preferred order of the blocks. It must be understood, however, that the various blocks may occur at any time relative to one another.

The method 700 begins by measuring the capacitance of a circuit that includes one or more IL-filled capacitors (block 702). For example, an interrogation unit may measure the capacitance of a circuit that includes one or more capacitors each including a first plate and a second plate separated from each other by an IL in a solid state, wherein the IL melts at a predetermined temperature and flows away from the first and second plates into a reservoir. In some embodiments, the circuit includes a pair of sensor contacts configured to be operatively connected to an interrogation unit, and the measuring operation includes operatively coupling the interrogation unit to the pair of sensor contacts (e.g., after storage and/or shipment of a perishable good or other temperature sensitive item within packaging on which the circuit is mounted). For example, the sensor circuit may be probed upon receipt of a shipment of a perishable good or other temperature sensitive item contained within packaging on which the sensor circuit is mounted.

The method 700 continues by determining, based on the capacitance of the circuit measured in block 702, a maximum temperature to which a perishable good or other temperature sensitive item was exposed (block 704). For example, the perishable good or other temperature sensitive item may be contained within packaging on which the circuit is mounted. Based on the measured capacitance, the interrogation unit may determine a maximum temperature to which the perishable good or other temperature sensitive item was exposed by comparing the measured capacitance to capacitance data (e.g., a look-up table that relates previously measured capacitances for circuits identical to the circuit with respect to temperature).

Next, in accordance with one or more embodiments, the method 700 continues by determining, based on the maximum temperature determined in block 704, whether to discard the perishable good or other temperature sensitive item (block 706). For example, based on the determined maximum temperature, the interrogation unit may retain the perishable good or other temperature sensitive item, cause the perishable good or other temperature sensitive item to be inspected for possible retention, or discard the perishable good or other temperature sensitive item.

Figure 8:
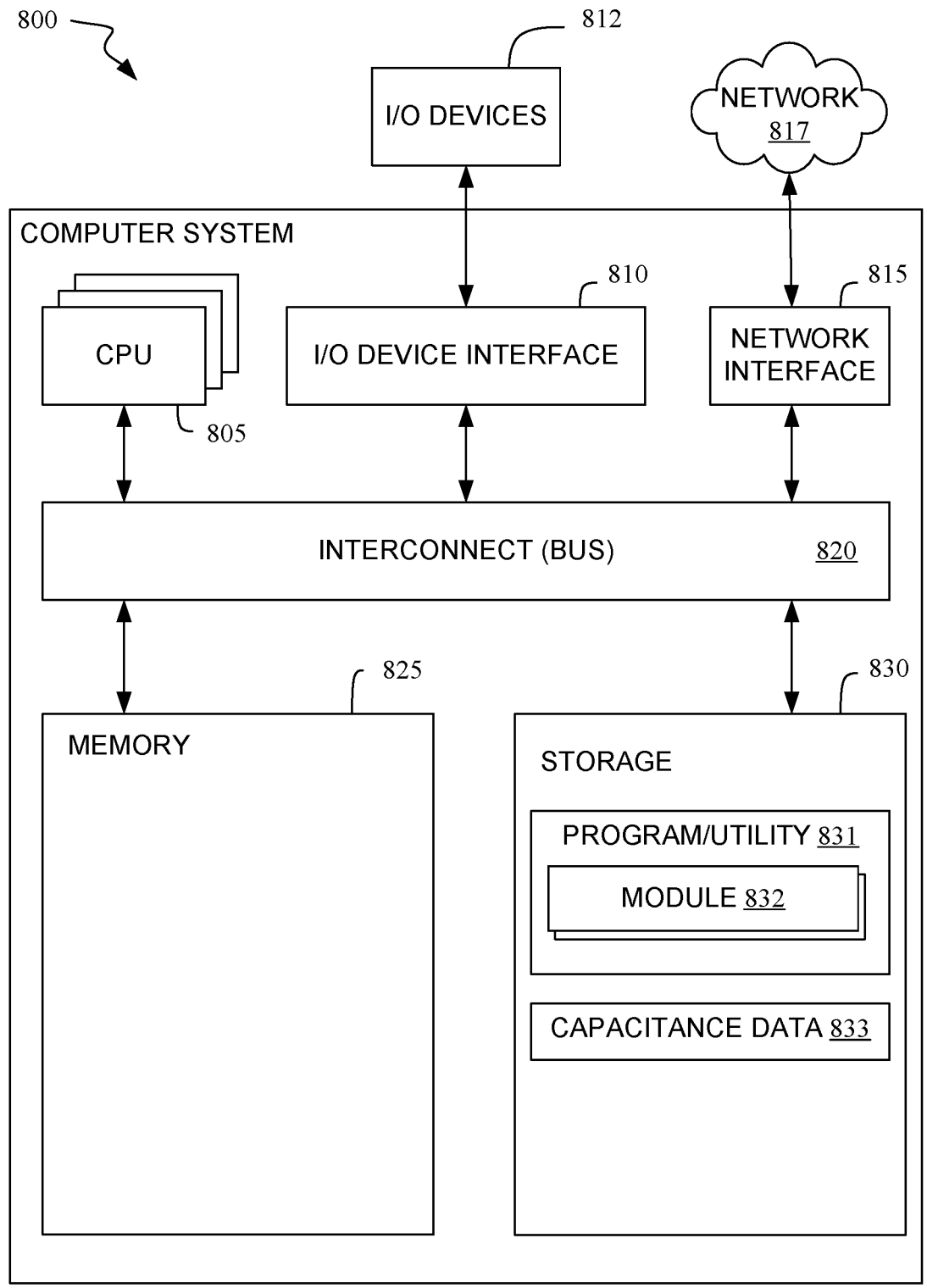
FIG. 8 is a block diagram illustrating an exemplary representation of a computer system for performing a computer-implemented method of determining a maximum temperature to which the perishable good or other temperature sensitive item was exposed and, based on the determined maximum temperature, determining whether to discard the perishable good or other temperature sensitive item, according to one or more embodiments.

FIG. 8 is a block diagram illustrating an exemplary representation of a computer system 800 for performing a computer-implemented method of determining a maximum temperature to which a perishable good or other temperature sensitive item was exposed and, based on the determined maximum temperature, determining whether to discard the perishable good or other temperature sensitive item, according to one or more embodiments. As shown, the computer system 800 includes, without limitation, at least one CPU 805, a network interface 815, an interconnect 820, a memory 825, and storage 830. The computer system 800 may also include an I/O device interface 810 used to connect I/O devices 812 (e.g., keyboard, display and mouse devices) to the computer system 800.

Each CPU 805 retrieves and executes programming instructions stored in the memory 825 and storage 830. Similarly, the CPU 805 stores and retrieves application data residing in the memory 825 and storage 830. The network interface 815 is configured to transmit data via the communications network 817. The interconnect 820 is used to transmit programming instructions and application data between each CPU 805, I/O device interface 810, network interface 815, memory 825, and storage 830. The interconnect 820 may be one or more busses. CPU 805 is included to be representative of a single CPU, multiple CPUs, a single CPU having multiple processing cores, and the like. Memory 825 is generally included to be representative of a random access memory, e.g., SRAM, DRAM or Flash. Storage 830, such as a hard disk drive, solid state disk (SSD), or flash memory storage drive, may store non-volatile data. Although shown as a single unit, the storage 830 may be a combination of fixed and/or removable storage devices, such as fixed disc drives, removable memory cards, optical storage, SSD or flash memory devices, network attached storage (NAS), connections to storage area-network (SAN) devices, or to the cloud.

A program/utility 831, having a set (at least one) of program modules 832, may be stored in storage 830 by way of example, and not limitation, as well as an operating system, one or more application programs, other program modules, and program data. Each of the operating system, one or more application programs, other program modules, and program data or some combination thereof, may include an implementation of a networking environment. The program modules 832 generally carry out the functions and/or methodologies of one or more embodiments as described herein. Storage 830 may also contain capacitance data 833 (e.g., a look-up table that relates previously measured capacitances with respect to temperatures for circuits identical to the sensor's circuit).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In one or more embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to one or more embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present invention, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet)

One skilled in the art will appreciate that many variations are possible within the scope of the present invention. Thus, while the present invention has been particularly shown and described with reference to preferred embodiments thereof, it will be understood by those skilled in the art that changes in form and details may be made therein without departing from the spirit and scope of the present invention.

What is claimed is:

1. A sensor comprising:
one or more capacitors each including a first plate and a second plate separated from each other by an ionic liquid (IL) in a solid state, wherein the IL is a salt having an organic cation and an anion, and wherein the IL melts at a predetermined temperature and flows away from the first and second plates into a void.

2. The sensor as recited in claim 1, wherein, for each of the one or more capacitors, the predetermined temperature at which the IL melts is within a range from approximately 65° C. to approximately 240° C.

3. The sensor as recited in claim 2, wherein the one or more capacitors include a plurality of capacitors connected to each other in series, and wherein the predetermined temperature at which the IL melts is different for each of the plurality of capacitors.

4. The sensor as recited in claim 2, wherein the one or more capacitors include a plurality of capacitors connected to each other in parallel, and wherein the predetermined temperature at which the IL melts is different for each of the plurality of capacitors.

5. The sensor as recited in claim 1, wherein, for each of the one or more capacitors, the IL is a benzothiazolium salt.

6. The sensor as recited in claim 1, wherein, for each of the one or more capacitors, the IL is selected from the group consisting of N-alkyl benzothiazolium iodides $[I]^-$, N-alkyl benzothiazolium tetrafluoroborates $[BF_4]^-$, N-alkyl benzothiazolium hexafluorophosphates $[PF_6]^-$, N-alkyl benzothiazolium bistrifluoromethanesulfonimides $[NTf_2]^-$, N-alkyl benzothiazolium trifluoromethylsulfonates $[CF_3SO_3]^-$, and combinations thereof.

7. The sensor as recited in claim 1, wherein, for each of the one or more capacitors, the IL is selected from the group consisting of N-Methylbenzothiazolium iodide, N-Ethylbenzothiazolium iodide, N-Propylbenzothiazolium iodide, N-Iso-propylbenzothiazolium iodide, N-Butylbenzothiazolium iodide, N-Pentylbenzothiazolium iodide, N-Hexylbenzothiazolium iodide, N-Heptylbenzothiazolium iodide, N-Octylbenzothiazolium iodide, N-Nonylbenzothiazolium iodide, N-Decylbenzothiazolium iodide, N-Undecylbenzothiazolium iodide, N-Dodecylbenzothiazolium iodide, and combinations thereof.

8. The sensor as recited in claim 1, wherein the one or more capacitors is/are included in a circuit and provided on a substrate, and wherein the circuit incudes a pair of sensor contacts configured to be operatively coupled to an interrogation unit for measuring the capacitance of the circuit.

9. The sensor as recited in claim 8, wherein the substrate is affixed to packaging configured to contain a perishable good.

10. The sensor as recited in claim 9, wherein the perishable good is selected from the group consisting of foods, adhesives, sealants, pharmaceuticals, organic chemicals, and biological materials.

11. The sensor as recited in claim 9, wherein the perishable good is a food.

12. The sensor as recited in claim 9, wherein the perishable good is an adhesive or sealant.

13. The sensor as recited in claim 1, wherein the one or more capacitors is/are included in a circuit provided on a printed circuit board (PCB) onto which one or more temperature sensitive component (TSCs) is/are soldered, and wherein the circuit incudes a pair of sensor contacts configured to be operatively coupled to an interrogation unit for measuring the capacitance of the circuit.

14. A method of determining a maximum temperature to which a perishable good or other temperature sensitive item was exposed, the method comprising:

measuring a capacitance of a circuit that includes one or more capacitors each including a first plate and a second plate separated from each other by an ionic liquid (IL) in a solid state, wherein the IL is a salt having an organic cation and an anion, and wherein the IL melts at a predetermined temperature and flows away from the first and second plates into a void;

determining, based on the measuring operation, a maximum temperature to which a perishable good or other temperature sensitive item was exposed.

15. The method as recited in claim 14, further comprising:

determining, based on the determination of the maximum temperature to which the perishable good or other temperature sensitive item was exposed, whether to discard the perishable good or other temperature sensitive item.

16. The method as recited in claim 14, wherein the circuit is provided on a substrate and incudes a pair of sensor contacts configured to be operatively coupled to an interrogation unit for measuring the capacitance of the circuit, and wherein the measuring operation includes operatively coupling the interrogation unit to the pair of sensor contacts.

17. The method as recited in claim 16, further comprising:

affixing the substrate to packaging for a perishable good, wherein the perishable good is selected from the group consisting of foods, adhesives, sealants, pharmaceuticals, organic chemicals, and biological materials.

18. The method as recited in claim 17, wherein the measuring operation includes operatively coupling the interrogation unit to the pair of sensor contacts after the perishable good has been stored and/or shipped in the packaging having the substrate affixed thereto.

19. A computer program product for determining a maximum temperature to which a perishable good or other temperature sensitive item was exposed, the computer program product comprising a non-transitory computer readable storage medium having program code embodied therewith, the program code executable by a processor, to perform a method comprising:

measuring a capacitance of a circuit that includes one or more capacitors each including a first plate and a second plate separated from each other by an ionic liquid (IL) in a solid state, wherein the IL is a salt having an organic cation and an anion, and wherein the IL melts at a predetermined temperature and flows away from the first and second plates into a void;

determining, based on the measuring operation, a maximum temperature to which a perishable good or other temperature sensitive item was exposed.

20. The computer program product as recited in claim 19, wherein the method further comprises:

determining, based on the determination of the maximum temperature to which the perishable good or other temperature sensitive item was exposed, whether to discard the perishable good or other temperature sensitive item.

* * * * *